Figure 1:
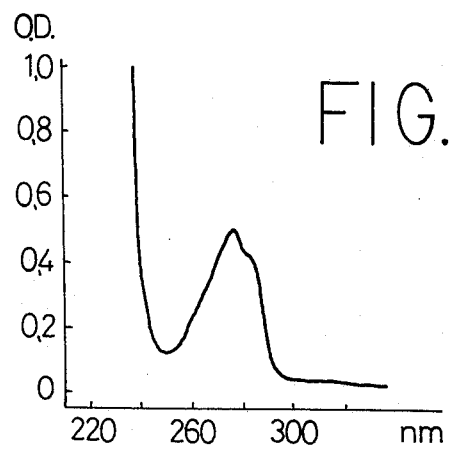

United States Patent [19]

Mizuno et al.

[11] 3,978,210

[45] Aug. 31, 1976

[54] ANTIBIOTIC ACULEACINS

[75] Inventors: Kimio Mizuno; Tetsuo Matsuda; Katsumi Asano; Akira Yagi; Masaki Takada; Tetsu Saito; Minoru Toriya; Shuzo Satoi; Kazuo Matsuura, all of Shizuoka, Japan

[73] Assignee: Toyo Jozo Kabushiki Kaisha, Shizuoka, Japan

[22] Filed: Mar. 6, 1975

[21] Appl. No.: 556,190

[30] Foreign Application Priority Data

Mar. 6, 1974 Japan................................ 49-26598

[52] U.S. Cl................................ 424/118; 424/119; 424/120; 424/121
[51] Int. Cl.$^2$........................................ A61K 35/70

[58] Field of Search ............ 424/118, 119, 120, 121

[56] References Cited

OTHER PUBLICATIONS

Miller, The Pfizer Handbook of Microbial Metabolites, McGraw–Hill Book Co., Inc., N.Y., N. Y., 1961, pp. 372–373.

Primary Examiner—Jerome D. Goldberg
Attorney, Agent, or Firm—Young & Thompson

[57] ABSTRACT

A family of antibiotics active against pathogenic yeasts and fungi comprises aculeacin-A, -B, -C, -D, -E, -F, and -G. These are produced from cultured broth of *Aspergillus aculeatus* FERM-P 2324.

8 Claims, 34 Drawing Figures

ANTIBIOTIC ACULEACINS

This invention relates to antibiotic aculeacins. More particularly, this invention relates to an aculeacin group of antibiotics active against pathogenic yeast and fungi.

We have found that a fungus belonging to genus Aspergillus, strain No. M 4214 produced unknown antibiotics active against yeasts such as *Candida albicans* and fungi such as pathogenic fungi, and designated as aculeacins.

The said Aspergillus strain M 4214 has the following taxonomic properties.

A. Microscopic observation:
1. Czapeck agar medium:
   Growth: rapid, diameter 45–60 mm. at 26°C., in 10 days.
   Surface of colony: flat; white at an early stage of culture; light tan (3gc) — beaver (4li) dependent on the degree of formation of conidia.
   Colony: Partially dusty yellowish (1½gc) conidial head.
   No formation of sclerotia
   Surrounding of colony: slight arachnoid
   Backside of colony: colorless — pearl pink (3ca).
   No formation of diffusible pigment and percolate.
   Growth at 37°C.: slow; 10–13mm. in 10 days.
2. Malt extract agar medium:
   Growth: rapid, diameter 70–72 mm. at 26°C., in 10 days.
   Surface of colony: flat; white at an early stage of culture; rose taupe (5 ig) dependent on the degree of formation of conidia.
   Conidia: large amount of formation.
   Surrounding of colony: more or less arachnoid
   Backside of colony: light wheat (2 ea).
   No formation of diffusible pigment and percolate.
   Growth at 37°C.: slow; 12–14 mm. in 10 days.
3. Potato-glucose agar medium:
   Growth rate and condition: similar to those on malt extract agar medium.
   Growth at 37°C.: slow; 12–14 mm in 10 days.
   Indication of color is based on the indication in "Color Harmony Manual", Ed. 1958, published by Container Corporation of America.

B. Microscopic observation:
   Conidial head is spherical at early stage, followed by segmented to several cylindrical. Length of conidiophore is 250–1000$\mu$, mainly in the range of 600–1000 $\mu$. Width is 10–13 $\mu$, light yellowish brown and wall is smooth and slightly thick. Thickness is about 1.5–2$\mu$. Vesicle is brown and spherical or nearly spherical; diameter 40–80$\mu$, mainly 50–70 $\mu$. Sterigma single lined and size of 6–8 × 3–4$\mu$ closely in line. Conidium is generally subspherical or spheroidal, showing variety of form, and size is 3.5–5 × 3–3.5$\mu$, brown colored and wall is rough. On Czapeck agar medium, light colored rod-shaped conidiospore of 5–7 × 2–3$\mu$ and smooth wall is partially formed together with the conidium hereinabove.

c. Growth conditions:
   Growth temperature: 13°–40°C. Growth pH: 2–9.
   Optimum growth temperature and pH: 29°–31°C., pH 3–5.

According to the taxonomical studies hereinbefore, this strain belongs to Aspergillus niger group [refer to Jap. J. Agrical. Chem., 27, 806–809 (1953), and The genus Aspergillus 328–331 (1965)] having black brown conidia. Further, this group is differentiated in two groups according to the single or double lined sterigma. This strain belongs to the single lined group. At present, fungi having single lined sterigma have been known as *Aspergillus japonicus* and *Aspergillus aculeatus*, and since in the *Aspergillus japonicus*, conidium is spherical or sub-spherical of 3–3.5 $\mu$, and vesicle is 15–45 $\mu$, mainly 20–35 $\mu$. and in the *Aspergilius aculeatus*, conidium is sub-spherical or spheroidal of 4.5–5 × 3–3.5 $\mu$, and vesicle is 35–100 $\mu$, mainly 60–80 $\mu$, therefore this strain resembles *Aspergillus aculeatus* in taxonomy. Furthermore, the strain *Aspergillus aculeatus* ATCC 1034 obtained from American Type Culture Collection and this strain resemble each other upon comparison, whereby this strain is referred to as *Aspergillus aculeatus* M 4214. This strain has been deposited in the Institute for Industrial Fermentation and Technology, Agency of Industrial Science and Technology, Japan, and assigned the permanent deposit number FERM-P 2324. Also, this strain is deposited in the United States Department of Agriculture, Agricultural Research Service, Northern Utilization Research and Development Division, and added to its permanent collection as deposit number NRRL 8075.

An object of the present invention is to provide novel antibiotic aculeacins.

Another object of the present invention is to provide an aculeacin group of antibiotics active against pathogenic fungi and yeasts.

Figure 2:
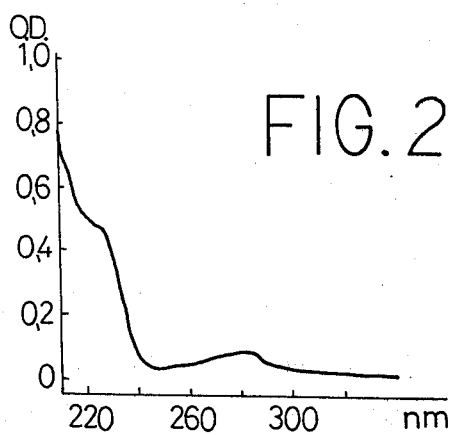

These and other objects, features and advantages of the present invention will become more apparent to any person skilled in the art upon reading the more detailed description set forth hereinbelow, in connection with the accompanying drawings, which show the following:

FIGS. 1 and 2: Ultraviolet absorption spectrum of aculeacin-A in methanol.

Figure 3:
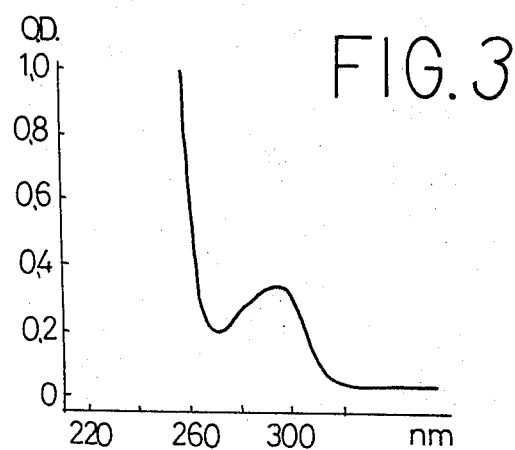
Figure 4:
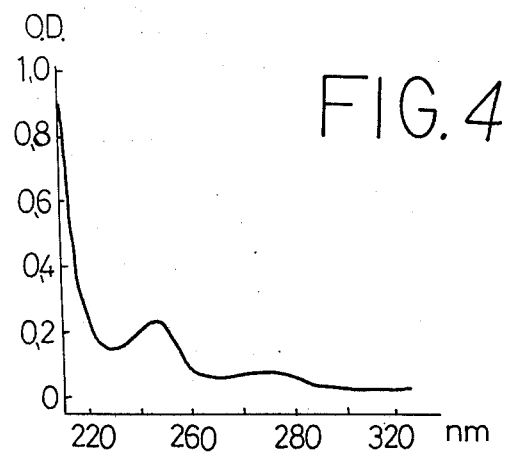

FIGS. 3 and 4: Ultraviolet absorption spectrum of aculeacin-A in 0.01—N KOH—90% methanol solution.

Figure 5:
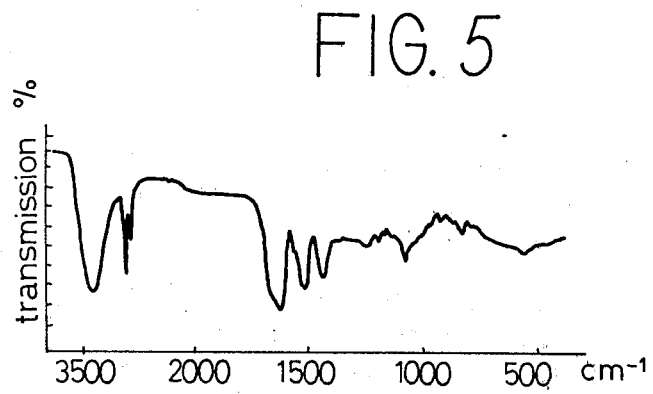

FIG. 5: Infrared absorption spectrum of aculeacin-A.

Figure 6:
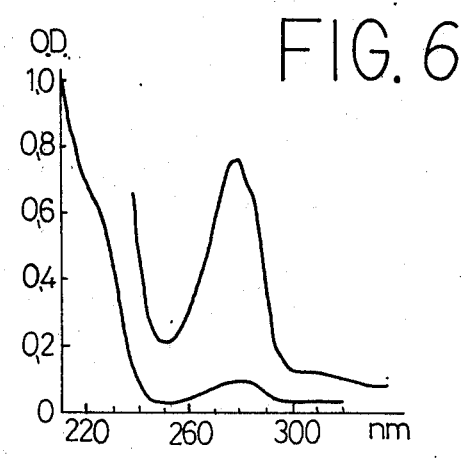

FIG. 6: Ultraviolet absorption spectrum of aculeacin-B in methanol.

Figure 7:
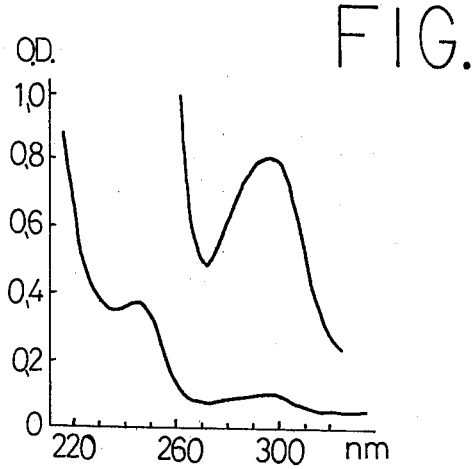

FIG. 7: Ultraviolet absorption spectrum of aculeacin-B in 0.01—N KOH—90% methanol solution.

Figure 8:
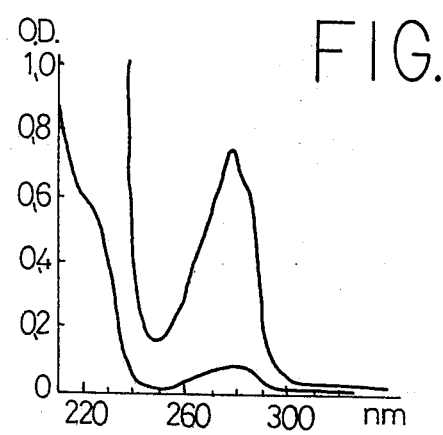

FIG. 8: Ultraviolet absorption spectrum of aculeacin-C in methanol.

Figure 9:
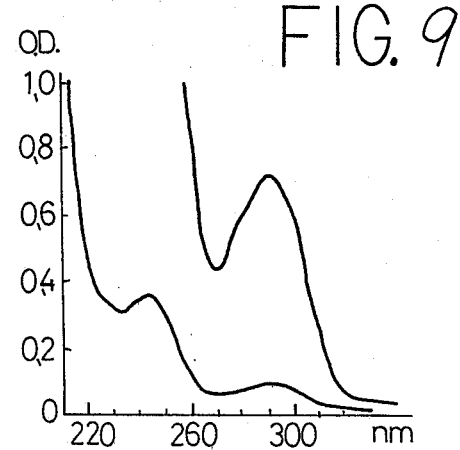

FIG. 9: Ultraviolet absorption spectrum of aculeacin-C in 0.01—N KOH—90% methanol solution.

Figure 10:
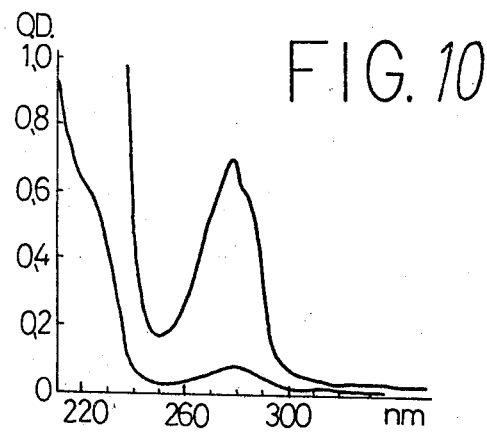

FIG. 10: Ultraviolet absorption spectrum of aculeacin-D in methanol.

Figure 11:
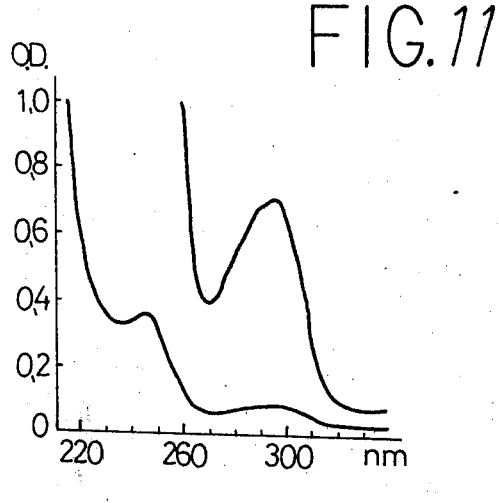

FIG. 11: Ultraviolet absorption spectrum of aculeacin-D in 0.01—N KOH—90% methanol solution.

Figure 12:
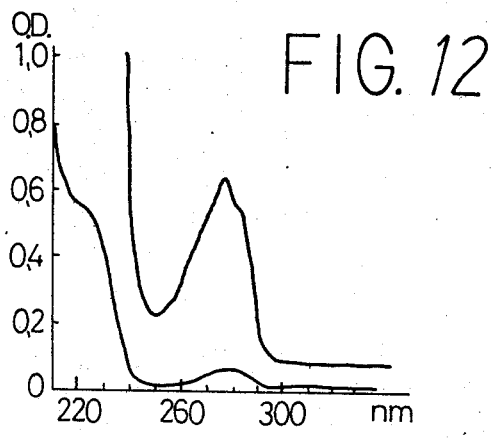

FIG. 12: Ultraviolet absorption spectrum of aculeacin-E in methanol.

Figure 13:
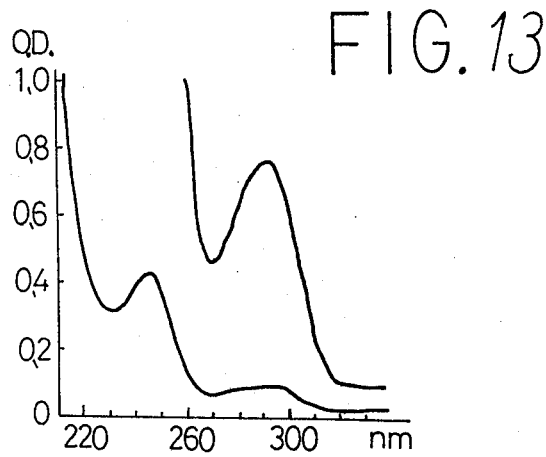

FIG. 13: Ultraviolet absorption spectrum of aculeacin-E in 0.01—N KOH—90% methanol solution.

Figure 14:
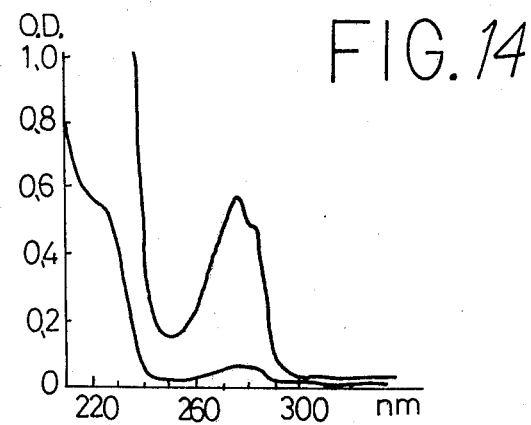

FIG. 14: Ultraviolet absorption spectrum of aculeacin-F in methanol.

Figure 15:
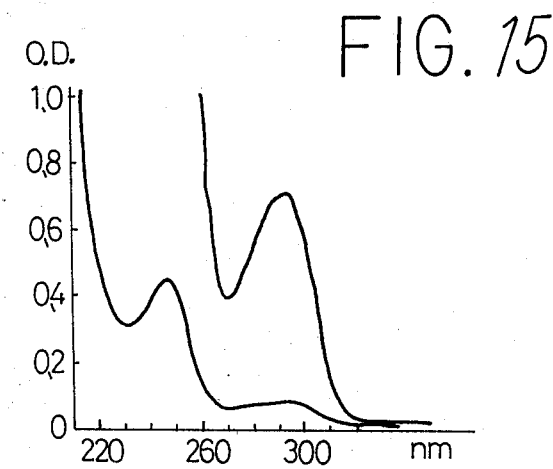

FIG. 15: Ultraviolet absorption spectrum of aculeacin-F in 0.01—N KOH—90% methanol solution.

Figure 16:
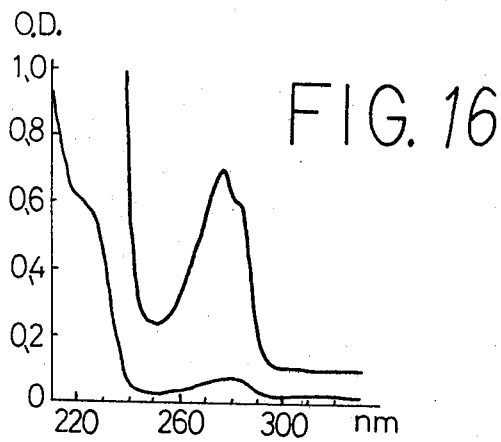

FIG. 16: Ultraviolet absorption spectrum of aculeacin-G in methanol.

Figure 17:
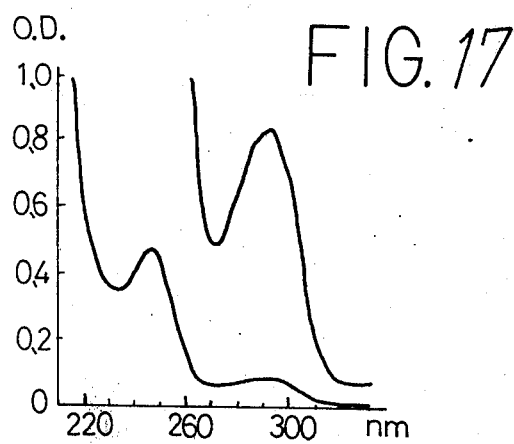

FIG. 17: Ultraviolet absorption spectrum of aculeacin-G in 0.01—N KOH—90% methanol solution.

Figure 18:
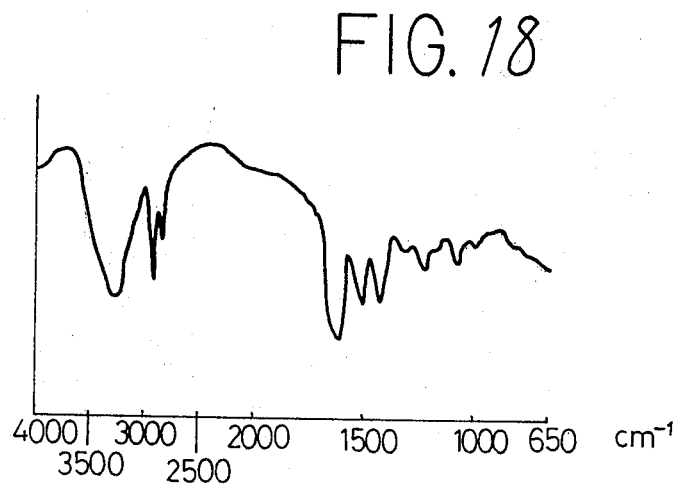

FIG. 18: Infrared absorption spectrum of aculeacin-B.

Figure 19:
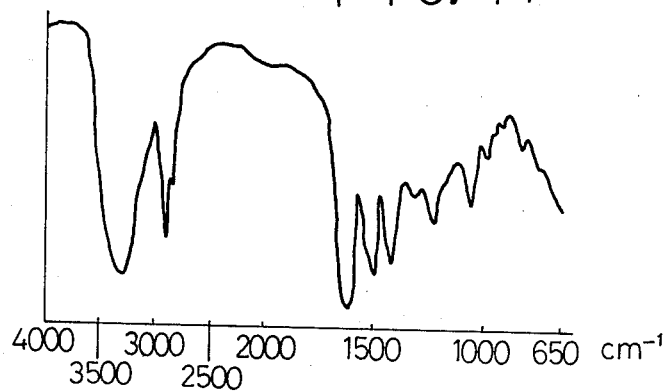

FIG. 19: Infrared absorption spectrum of aculeacin-C.

Figure 20:
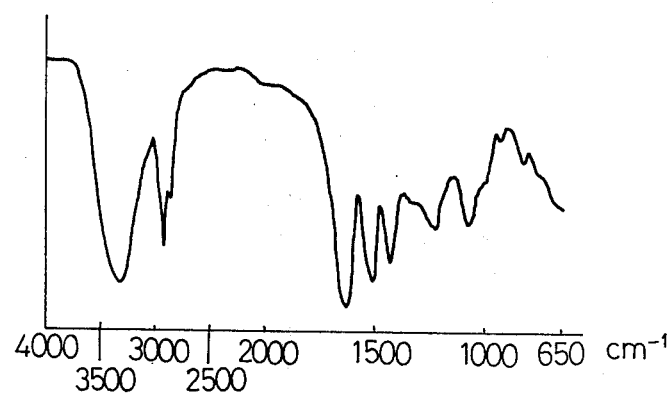

FIG. 20: Infrared absorption spectrum of aculeacin-D.

Figure 21:
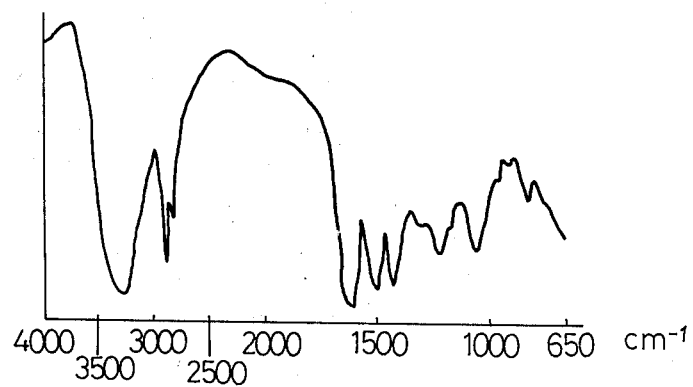

FIG. 21: Infrared absorption spectrum of aculeacin-E.

Figure 22:
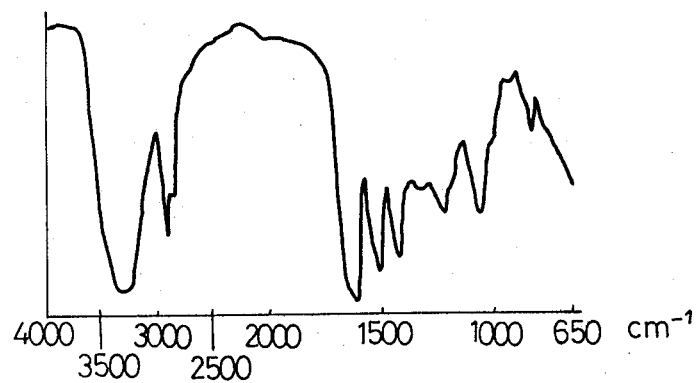

FIG. 22: Infrared absorption spectrum of aculeacin-F.

Figure 23:
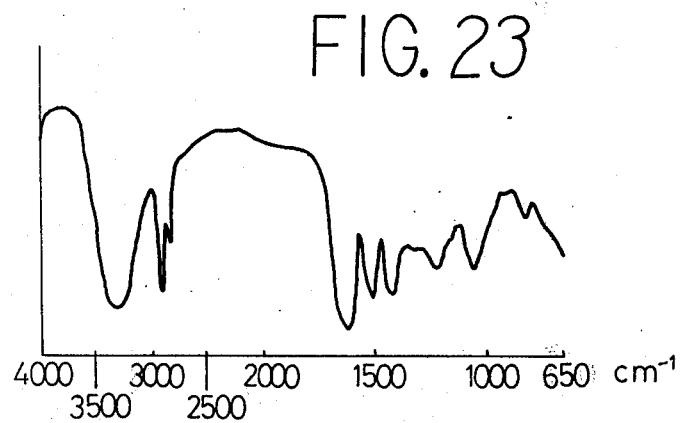

FIG. 23: Infrared absorption spectrum of aculeacin-G.

Figure 24:
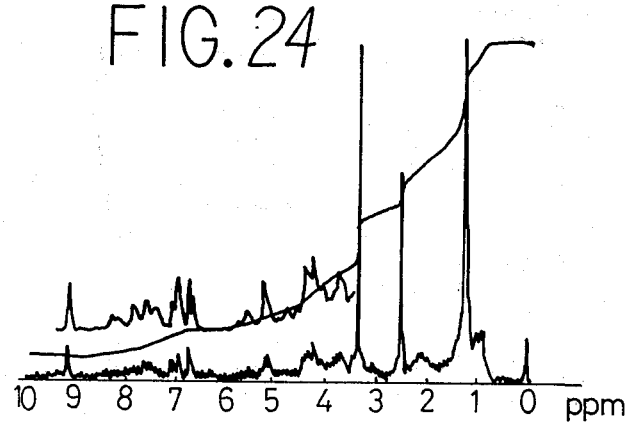

FIG. 24: NMR spectrum of aculeacin-B.

Figure 25:
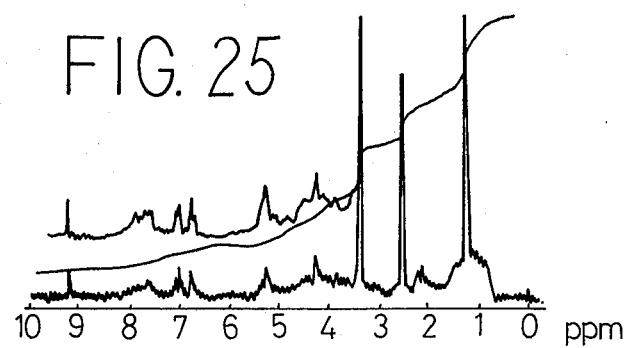

FIG. 25: NMR spectrum of aculeacin-C.

Figure 26:
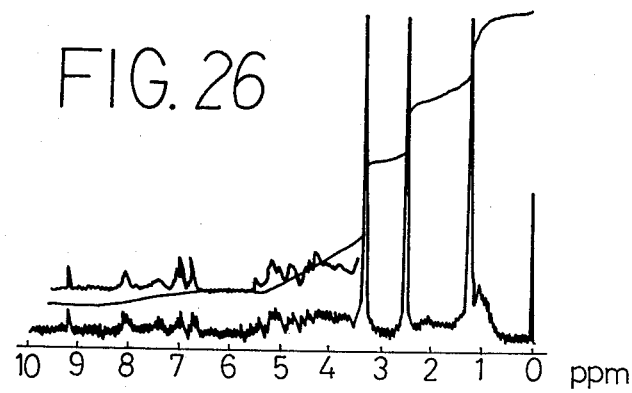

FIG. 26: NMR spectrum of aculeacin-D.

Figure 27:
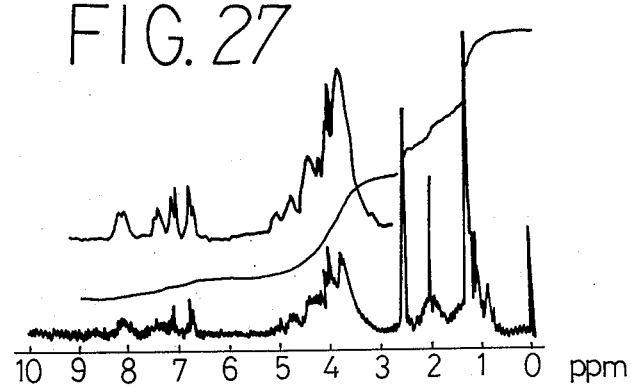

FIG. 27: NMR spectrum of aculeacin-E.

Figure 28:
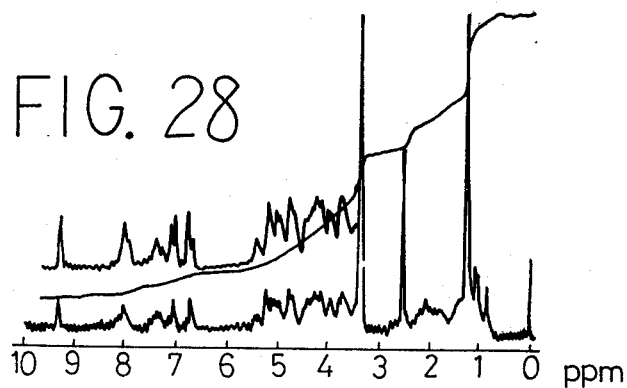

FIG. 28: NMR spectrum of aculeacin-F.

Figure 29:
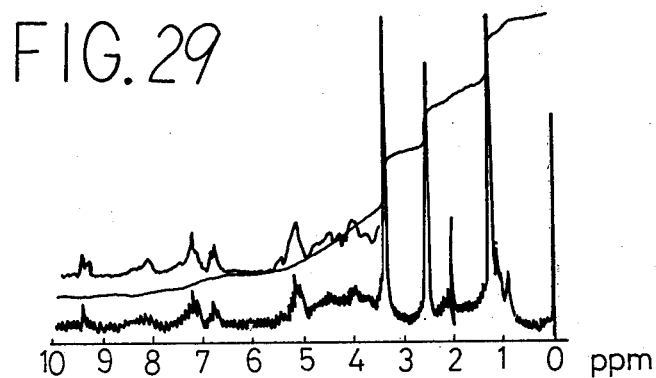

FIG. 29: NMR spectrum of aculeacin-G.

Figure 30:
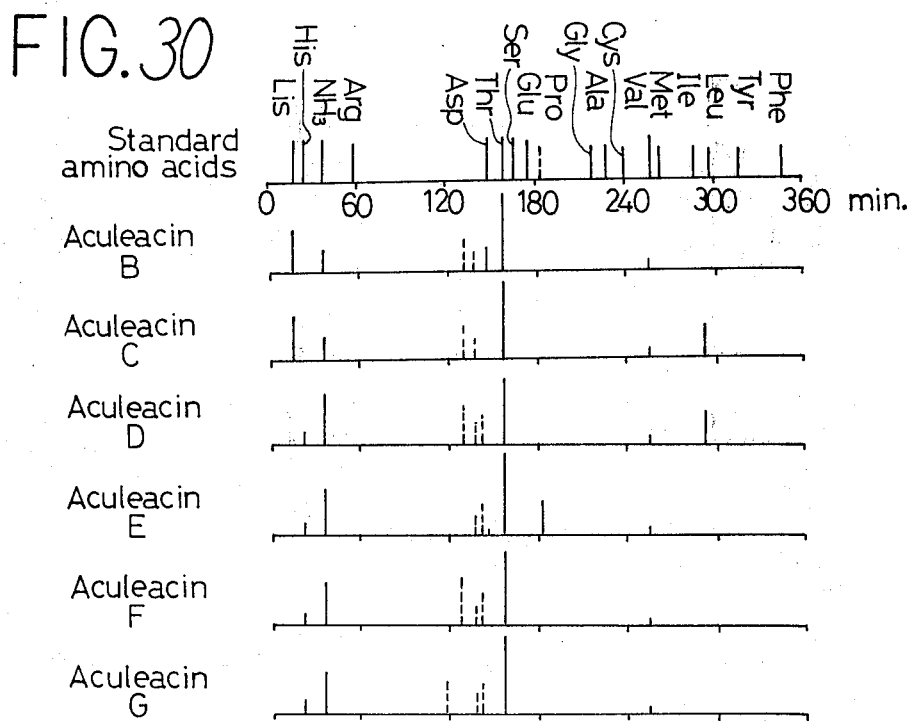

FIG. 30: Schematic chart of amino acid analysis of aculeacin-B, -C, -D, -E, -F and -G.

Figure 31:
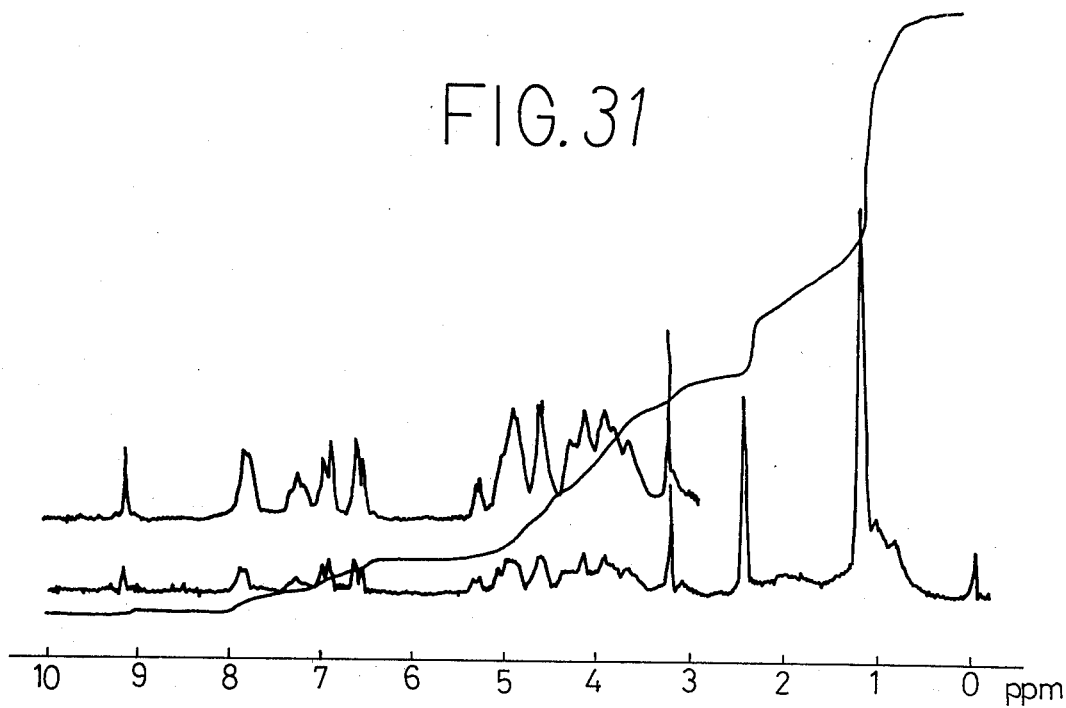

FIG. 31: NMR spectrum of aculeacin-A.

Figure 32:
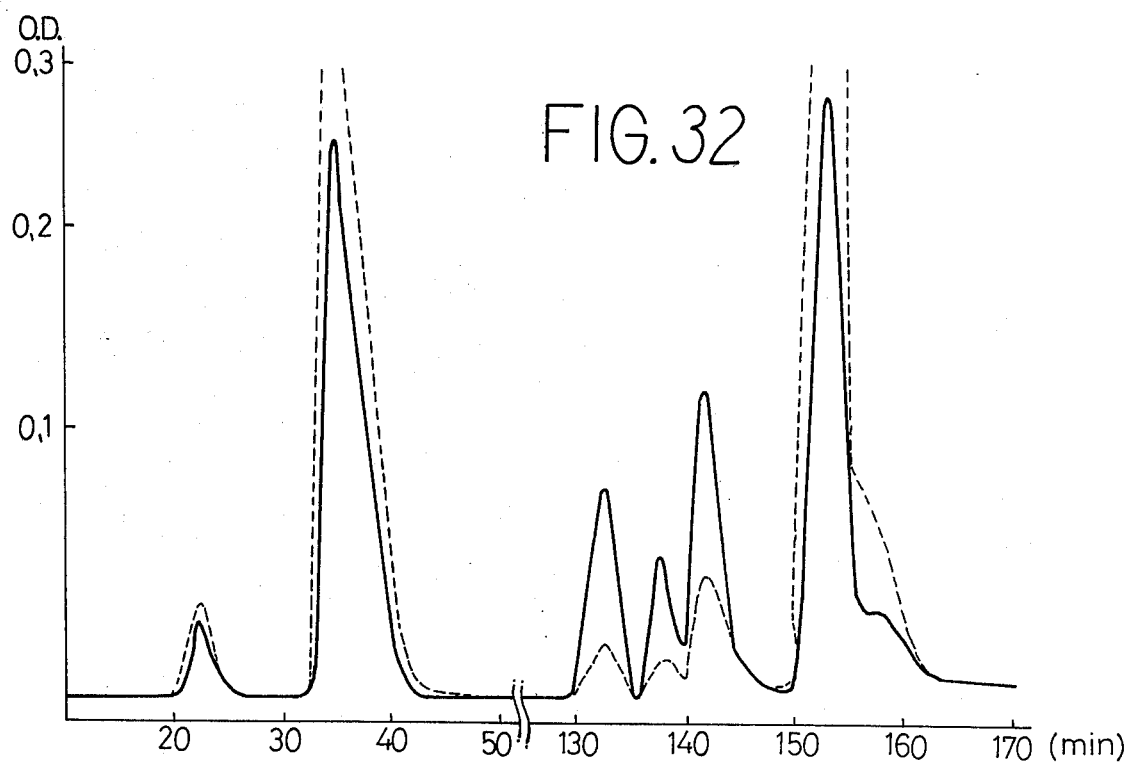

FIG. 32: Amino acid analysis chart of aculeacin-A hydrochloric acid hydrolysate.

Figure 33:
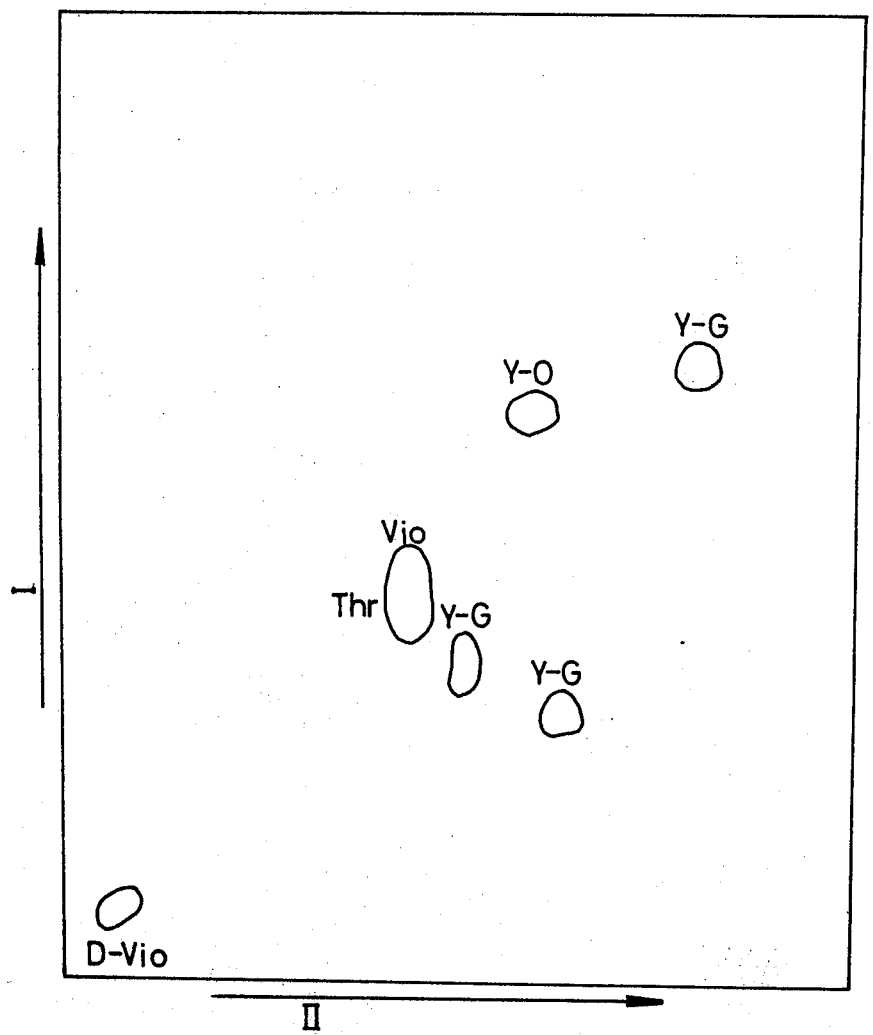

FIG. 33: Two dimensional thin layer chromatogram of aculeacin-A hydrochloric acid hydrolysate.

Figure 34:
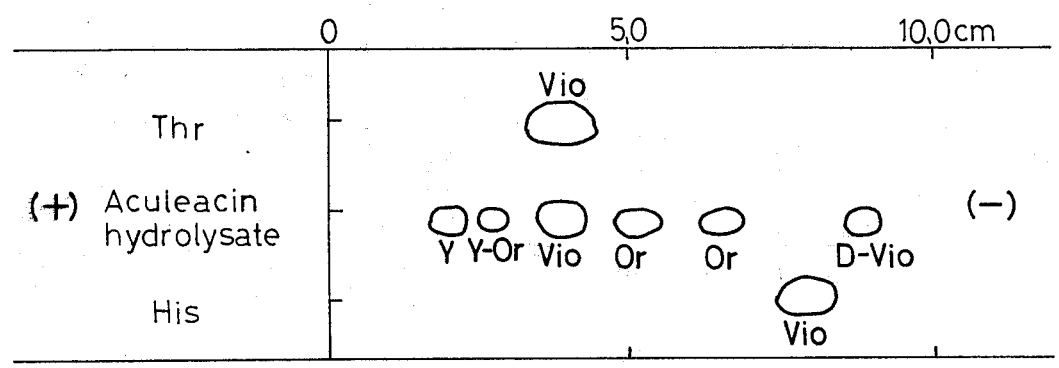

FIG. 34: High voltage paper electrophoresis pattern aculeacin-A hydrochloric acid hydrolysate.

Aculeacin group antibiotics consist of aculeacin-A, -B, -C, -D, -E, -F and -G, which are produced by culturing *Aspergillus aculeatus* M 4214 FERM-P 2324, having strong anti-fungal activity, showing the peak of ultraviolet absorption at 277 m$\mu$ and containing threonine as amino acid component. Since the aculeacin group of antibiotics are peptide antibiotics, hereinafter these groups of antibiotics will be designated as aculeacins.

According to this invention, aculeacins are produced by inoculating a strain of *Aspergillus aculeatus* M 4214 FERM-P 2324 in a suitable nutrient medium. The cultivation of the microorganism can be carried out in a number of different ways such as liquid culture or solid culture. In an industrial production, submerged aeration culture inoculated with a 1–2 days cultured spore suspension of *Aspergillus aculeatus* M 4214 FERM-P 2324 is preferable.

Nutrient media which are useful for the production of aculeacins may include an assimilable source of carbon such as glucose; as assimilable source of organic and inorganic nitrogen such as corn steep liquor, peptone and ammonium sulfate, and the media further include salts such as phosphate, magnesium or potassium.

The culturing temperature for production of aculeacins may be selected within the range of temperature in which the microorganism can grow and aculeacins can be produced, and is preferably 25°–28°C.

The culturing period is generally 70–90 hours, and when the culture broth reaches maximum potency in terms of antibiotic production, the cultivation should naturally be terminated.

In cultured broth obtained thus, aculeacins are accumulated in mycelia and partially in the outside of mycelia.

Aculeacins can be assayed by cup-assay method or paper disc-assay method using *Candida albicans* or *Trichophyton asteroides* as test organisms.

Aculeacins can be preferably and effectively isolated from mycelia.

According to a preferred procedure, the whole broth is filtered to obtain mycelium containing aculeacins using drum-filter, filter-press or centrifugal separator. The thus-obtained wet mycelia is extracted with water miscible organic solvent such as alcohol and acetone, then solvent in the extract is distilled off, the residue is diluted with water, further the diluent is extracted with n-butanol or ethyl acetate and the extract is washed with water and concentrated under reduced pressure to obtain oily material. The oily material can be purified by absorption or partition chromatography using active alumina, silica gel or the like.

The physico-chemical properties of aculeacins are as follows:

1. Elementary analysis:

|  | C% | H% | N% |
|---|---|---|---|
| Aculeacin-A | 56.38 | 8.01 | 9.29 |
| Aculeacin-B | 60.52 | 8.54 | 9.46 |
| Aculeacin-C | 59.04 | 8.27 | 9.66 |
| Aculeacin-D | 57.95 | 8.02 | 8.83 |
| Aculeacin-E | 57.46 | 8.01 | 9.11 |
| Aculeacin-F | 54.81 | 7.59 | 9.04 |
| Aculeacin-G | 56.08 | 7.73 | 8.68 |

2. Molecular weight:

|  | Rast Method: | Amino acid analysis:* |
|---|---|---|
| Aculeacin-A | 1,021 | (869) n |
| Aculeacin-B | 1145 – 1206 | (540) n |
| Aculeacin-C | 1133 – 1199 | (540) n |
| Aculeacin-D | 1209 – 1284 | (555) n |
| Aculeacin-E | 1195 – 1270 | (650) n |
| Aculeacin-F | 1227 – 1287 | (565) n |
| Aculeacin-G | 1255 – 1330 | (710) n |

*Calculated from detected amount of threonine.

3. Molecular formula:

| Aculeacin-B: | $C_{58-61}H_{96-104}N_8O_{15-16}$ |
|---|---|
| Aculeacin-C: | $C_{56-59}H_{92-100}N_8O_{16-17}$ |
| Aculeacin-D: | $C_{58-62}H_{96-106}N_8O_{19-20}$ |
| Aculeacin-E: | $C_{57-61}H_{94-104}N_8O_{19-20}$ |
| Aculeacin-F: | $C_{56-59}H_{90-98}N_8O_{22-23}$ |
| Aculeacin-G: | $C_{58-62}H_{94-106}N_8O_{22-23}$ |

4. Melting point:

| Aculeacin-A: | 164 – 167°C. (fuse) |
|---|---|
| Aculeacin-B: | 148 – 151°C. (fuse) |
| Aculeacin-C: | 164 – 168°C. (fuse) |
| Aculeacin-D: | 159 – 162°C. (fuse) |
| Aculeacin-E: | 186 – 191°C. (fuse) |
| Aculeacin-F: | 163 – 167°C. (fuse) |
| Aculeacin-G: | 166 – 170°C. (fuse) |

None of the compounds shows a clear melting point.

5. Specific Rotation: $[\alpha]_D^{24}$ (C=1.0 methanol)

| Aculeacin-A*: | −53° |
|---|---|
| Aculeacin-B: | −45° |
| Aculeacin-C: | −47.5° |
| Aculeacin-D: | −46° |
| Aculeacin-E: | −66° |
| Aculeacin-F: | −55° |
| Aculeacin-G: | −52° |

*Result of $[\alpha]_D^{23}$ (C=0.53 methanol)

6. Ultraviolet absorption spectrum:

| | | | | | |
|---|---|---|---|---|---|
| FIG. 1: | Aculeacin-A in methanol (324 gamma/ml.). | | | | |
| FIG. 2: | Aculeacin-A in methanol (32.4 gamma/ml.). | | | | |
| FIG. 3: | Aculeacin-A in 0.01-N KOH-90% methanol (162 gamma/ml.) | | | | |
| FIG. 4: | Aculeacin-A in 0.01-N KOH-90% methanol (16.2 gamma/ml.) | | | | |
| FIG. 6: | Aculeacin-B in methanol (40 and 400 gamma/ml.). | | | | |
| FIG. 7: | Aculeacin-B in 0.01-N KOH-90% methanol (36 and 360 gamma/ml.). | | | | |
| FIG. 8: | Aculeacin-C in methanol (40 and 400 gamma/ml.). | | | | |
| FIG. 10: | Aculeacin-D in methanol (40 and 400 gamma/ml.). | | | | |
| FIG. 12: | Aculeacin-E in methanol (40 and 400 gamma/ml.). | | | | |
| FIG. 14: | Aculeacin-F in methanol (40 and 400 gamma/ml.). | | | | |
| FIG. 16: | Aculeacin-G in methanol (40 and 400 gamma/ml.). | | | | |
| FIG. 9: | Aculeacin-C in 0.01-N KOH-90% methanol (40 and 400 gamma/ml.). | | | | |
| FIG. 11: | Aculeacin-D in 0.01-N KOH-90% methanol (40 and 400 gamma/ml.). | | | | |
| FIG. 13: | Aculeacin-E in 0.01-N KOH-90% methanol (40 and 400 gamma/ml.). | | | | |
| FIG. 15: | Aculeacin-F in 0.01-N KOH-90% methanol (40 and 400 gamma/ml.). | | | | |
| FIG. 17: | Aculeacin-G in 0.01-N KOH-90% methanol (40 and 400 gamma/ml.). | | | | |

As shown in the figures each component has the maximum peak at 277 m$\mu$ and shoulders at 226 and 283 m$\mu$.

$E_{1\ cm}^{1\%}$ of each compound are shown in the following table:

| | in methanol | | | in 0.01-N KOH-90% methanol | |
|---|---|---|---|---|---|
| | 225 m$\mu$ (shoulder) | 277 m$\mu$ (peak) | 283 m$\mu$ (shoulder) | 247 m$\mu$ | 295.5 m$\mu$ |
| A | 145 | 15.6 | 13 | 148 | 21.9 |
| B | 144 | 18.5 (279 m$\mu$) | 15.6 (285m$\mu$) | 104 | 21.6 (297m$\mu$) |
| C | 137 | 18.3 (279m$\mu$) | 15.1 (285m$\mu$) | 100 | 20.0 |
| D | 137 | 17.2 (278m$\mu$) | 14.3 (284m$\mu$) | 100 | 19.5 |
| E | 132 | 16.0 | 13.5 | 120 | 21.2 |
| F | 134 | 14.5 | 11.8 | 125 | 19.6 |
| G | 143 | 17.4 | 14.7 | 115 | 23.0 |

7. Infrared absorption spectrum (KBr tablet):

| | |
|---|---|
| FIG. 5: | Aculeacin-A. |
| FIG. 18: | Aculeacin-B. |
| FIG. 19: | Aculeacin-C. |
| FIG. 20: | Aculeacin-D. |
| FIG. 21: | Aculeacin-E. |
| FIG. 22: | Aculeacin-F. |
| FIG. 23: | Aculeacin-G. |

8. Nuclear Magnetic Resonance spectrum:

NMR spectra of aculeacins in deuteron dimethyl sulfoxide (DMSO-d6) at 100 MHz are shown in FIGS. 24, 25, 26, 27, 28, 29 and 31 (inner standard: TMS).

9. Color reaction:
Shown in the following table:

| Color reaction +: positive —: negative | Aculeacins | | | | | | |
|---|---|---|---|---|---|---|---|
| | A | B | C | D | E | F | G |
| Pauli reaction | + | + | + | + | + | + | + |
| Folin reaction | + | ± | ± | + | + | + | + |
| HIO$_4$-benzidine reaction | + | + | + | + | + | + | + |
| KMnO$_4$ decolorization reaction | + | + | + | + | + | + | + |
| Ninhydrin reaction | — | — | — | — | — | — | — |
| Sakaguchi reaction | — | — | — | — | — | — | — |
| Ehrlich reaction | — | — | — | — | — | — | — |
| Isatin | — | — | — | — | — | — | — |

10. Solubility:
Soluble: lower alcohols.
Slight soluble: ethyl acetate and water.
Insoluble: acetone, chloroform, n-hexane and petroleum ether.

11. Aculeacins are decomposed at an alkaline pH and due to slight solubility, aculeacins are immobile upon electrophoresis. Aculeacins cannot be transferred from butanol solution to water at pH 2–9. This may indicate the neutral nature of aculeacins.

12. Color: White crystalline powder.

13. Rf value:
Carrier: silica gel sheet (product of Eastman Kodak Co., Eastman Chromagram sheet No. 6060).

| | |
|---|---|
| Solvent: A: | ethyl acetate — isopropanol — water (10 : 2 : 1). |
| B: | chloroform - methanol (10 : 3). |
| C: | ethyl acetate - methanol - water (20 : 4 : 1) |
| D: | ethyl acetate - n-butanol 3 : 1). |

Developer: iodine.
bioassay using *Candida albicans* (Aculeacin-A only).

| Solvent System | A | B | C | D |
|---|---|---|---|---|
| Aculeacin-A: | | 0.47 | 0.28 | 0.37 |
| Aculeacin-B: | 0.52 | 0.91 | | |
| Aculeacin-C: | 0.46 | 0.87 | | |
| Aculeacin-D: | 0.35 | 0.67 | | |
| Aculeacin-E: | 0.18 | 0.58 | | |
| Aculeacin-F: | 0.15 | 0.38 | | |
| Aculeacin-G: | 0.13 | 0.32 | | |

14. Amino acid composition:
Aculeacins are hydrolyzed with 6N HCl, at 110°C. for 20 hours and ninhydrin positive components are analyzed by automatic amino acids analyzer. Results are shown in FIG. 30 (solid line: absorption at 570 m$\mu$; dotted line: absorption at 440 m$\mu$), and the following table, and in FIG. 32 (solid line: absorption at 440 m$\mu$; dotted line: absorption at 570 m$\mu$).

Two dimensional thin layer chromatography is performed by using cellulose plate, with n-butanol-acetic acid-water (3 : 1 : 1) as primary developer and phenol-water (75 : 25) as secondary developer. Coloring by ninhydrin is shown in FIG. 33 in which L-threonine and five unknown ninhydrin-positive components are found.

FIG. 34 shows the result of paper electrophoresis using filter paper (Toyo filter paper No. 51, product of Toyo Roshi Co., Tokyo), at 2000 volts for 30 minutes (pH 1.8 in formic acid-acetic acid buffer). L-threonine and L-histidine are used as control. L-threonine and five unknown ninhydrin-positive components are found.

In FIGS. 33 and 34, the following abbreviations are used.

Vio: violet, Y-G: yellowish green, Y-O: orange yellow, D-Vio: dark violet, Y: yellow, Or: orange, Thr: L-threonine and His; L-histidine.

In FIGS. 32, 33 and 34 are shown the result of hydrolysis of aculeacin-A.

| Time (minutes) | 16 | 22 | 37 | 118 | 128 | 132 | 138 | 142 | 146 | 158 | 182 | 256 | 293 |
|---|---|---|---|---|---|---|---|---|---|---|---|---|---|
| Color | V | V | V | Y | Y | Y | Y | Y | Y | V | V | Y | V |
| Amino acid | UK | UK | $NH_3$ | UK | UK | UK | UK | UK | UK | Thr | Pro | UK | UK |
| Aculeacins A | − | + | + | − | − | + | + | + | − | + | − | Tr | − |
| B | + | − | + | − | − | + | + | − | + | + | − | Tr | − |
| C | + | − | + | − | − | + | + | − | − | + | − | Tr | + |
| D | − | + | + | − | − | + | + | + | − | + | − | Tr | + |
| E | − | + | + | − | − | − | + | + | − | + | + | Tr | − |
| F | − | + | + | − | + | − | + | + | − | + | − | Tr | − |
| G | − | + | + | + | − | − | + | + | − | + | − | Tr | − |

Abbreviations:
Color: Y; yellow. (strong absorption at 440 mu)
V; violet (strong absorption at 570 mu)
+ : positive peak
− : no peak
Tr: trace peak
UK: unknown amino acid Lis : 17.5 minutes
His : 24 minutes
Asp : 148 minutes
Ile : 288 minutes
Leu : 297 minutes Aculeacins are peptide antibiotics slightly soluble in water in accordance with the physico-chemical properties hereinabove.

Among the antibiotics hitherto reported, having ultraviolet absorption maximum at 277 m$\mu$ in methanol, myroridin (Jap. Pat. Publ. 45-12276), athlestatin (Jap. Publ. 41-12668), monilin [Takeda Institute Annual Report, 14, 8-10 (1955)], oryzamycin (Jap. Pat. Publ. 38-2800), saramycetin (Antimicrobial Agents and Chemotherapy, 1961, 436-444), unamycin [J. Antibiotics, Ser. A, 13, 114-120 (1960)] and vengicide (British Pat. No. 764,198) may resemble aculeacins. Aculeacins are however different from those antibiotics for the following reasons:

Myroridin is a basic water-soluble antibiotic which differs from aculeacins. Athlestatin is similar to aculeacins in its physico-chemical properties and biological property, however, the molecular formula of athlestatin is $C_{32}H_{58}N_5O_{12}$ and ultraviolet absorption maxima of athlestatin are at 278 and 225 m$\mu$, different from aculeacins. Monilin is a basic nucleoside substance and the nitrogen content in its elemental analysis is higher than that of aculeacins. Oryzamycin is an acidic oily substance. Saramycetin yields aspartic acid, cystine, glycine and threonine upon hydrolysis, and unamycin is an acidic polyene substance. Vengicide is similar to monilin, a nucleoside substance.

Thus, aculeacins are novel antibiotics different from the antibiotics hitherto known in this art.

The biological properties of the aculeacins are as follows:

1. Activity against bacteria:

Assay medium: glucose bouillon agar, at 37°C., for 18 hours.

Almost no activity against bacteria such as Staphylococcus aureus, Bacillus subtilis, Sarcina lutea or the like.

2. Activity against yeasts:

Assay medium: Sabroud agar, at 30°C., for 48 hours.

Results of minimum inhibitory concentration are shown in the following table:

| Test organisms | Aculeacins | | | | | | |
|---|---|---|---|---|---|---|---|
| | A | B | C | D | E | F | G |
| Candida albicans 1 | 0.2 | 0.8 | 0.2 | 0.05 | 6.3 | 0.4 | 0.4 |
| Candida albicans 2 | <0.1 | 0.4 | 0.1 | 0.025 | 3.2 | 0.2 | 0.2 |
| Candida albicans 3 | <0.1 | 0.4 | 0.1 | 0.025 | 3.2 | 0.2 | 0.2 |
| Candida albicans 4 | 0.2 | 0.4 | 0.1 | 0.05 | 3.2 | 0.4 | 0.2 |
| Candida albicans 5 | 1.6 | 0.4 | 0.1 | 0.05 | 3.2 | 0.2 | 0.1 |
| Candida albicans 6 | <0.1 | 0.4 | 0.1 | 0.05 | 3.2 | 0.2 | 0.1 |
| Candida krusei | 0.8 | 1.6 | 0.4 | 0.1 | 3.2 | 0.8 | 0.4 |
| Candida parakrusei | 3.2 | 6.3 | 1.6 | 0.4 | 50 | 3.2 | 3.2 |
| Candida tropicalis | >100 | >100 | >100 | >100 | >100 | >100 | >100 |
| Candida pseudotropicalis | 0.8 | 6.3 | 3.2 | 0.4 | 50 | 6.3 | 6.3 |
| Saccharomyces cerevisiae | 1.6 | 3.2 | 1.6 | 0.2 | 25 | 3.2 | 3.2 |
| Saccharomyces sake | 1.6 | 6.3 | 3.2 | 0.4 | >100 | 6.3 | 6.3 |
| Mycotorula japonica | <0.1 | 0.2 | 0.05 | 0.025 | 0.8 | 0.1 | 0.1 |
| Torula utilis | <0.1 | 0.05 | 0.0125 | 0.0063 | 0.2 | 0.05 | 0.05 |
| Cryptococcus neoformans | >100 | >100 | >100 | >100 | >100 | >100 | >100 |
| Candida albicans 7 | 3.2 | | | | | | |
| Candida albicans 8 | 0.1 | | | | | | |
| Candida quilliermondii | 0.8 | | | | | | |

3. Activity against fungi:

Since aculeacins have no fungicidal activity, fungi are inoculated in Sabroud agar medium containing several concentrations of aculeacins, and incubated at 26°C. 7 to 14 days. 80% growth inhibitory concentrations of aculeacins are measured by the ratio of area of giant colony to that of control without aculeacins.

I. 80% growth inhibitory concentration (gamma/ml.) of aculeacin-A.
  i) dermatopathogenic fungi:
     Trichophyton asteroides    0.004
     Trichophyton rubrum    0.006
     Microsporum gypseum    0.008
  ii) phytopathogenic fungi:
     Fusarium oxysporum f. lini    2.0
     Cercospora kikuchii    4.0
     Corynespora cassicola    2.0
     Diaporthe phaseolorum    0.01
     Sclerotium bataticola    0.08
     Ascochyta soyaecola    0.08
     Collectotrichum linicolum    0.4
     Glomerella cingulata    0.06
     Helminthosporium oryzae    0.008

II. 80% growth inhibitory concentration of aculeacins.
           Aspergillus    Trichophyton
           fumigatus    asteroides -continued

|  | (gamma/ml.) | (gamma/ml.) |
|---|---|---|
| Aculeacin-B | 7.0 | 0.04 |
| Aculeacin-C | 0.7 | 0.01 |
| Aculeacin-D | 0.4 | 0.005 |
| Aculeacin-E | 2.0 | 0.003 |
| Aculeacin-F | 0.6 | 0.003 |
| Aculeacin-G | 0.7 | 0.005 |
| Aculeacin-A | 0.5 | 0.004 |

4. Acute toxicity on mouse:

Aculeacins are almost insoluble in water, soluble in 1% sodium carboxy-methyl cellulose (CMC) solution and sodium deoxycholate (DOC). $LD_{50}$ of aculeacin-A injection prepared by using those additives is as follows:

| Route of administration | $LD_{50}$ (mg./kg.) |
|---|---|
| i.p. | 600 (CMC) |
| i.m. | 600 (DOC), >3460 (CMC) |
| i.v. | 350 (DOC) |
| p.o. | >3000 (CMC) |

The solvent is shown in parentheses.

Intraperitoneal administration of aculeacins, suspended in 0.5% carboxymethyl cellulose solution, on mice at 300 mg./kg. is shown as follows: The ddy strain mice, male, weight 20 g., four in each group are used.

|  | Number of Deaths | | |
|---|---|---|---|
|  | After 24 hours | 48 hours | 72 hours |
| Aculeacin-B | 0 | 0 | 0 |
| Aculeacin-C | 0 | 0 | 0 |
| Aculeacin-D | 0 | 0 | 0 |
| Aculeacin-E | 0 | 0 | 0 |
| Aculeacin-F | 0 | 0 | 0 |
| Aculeacin-G | 1 | 0 | 0 |

5. Experimental chemotherapeutic effect in mice:

Mice infected with strong pathogenic *Candida albicans* were treated with aculeacin-A. Results are illustrated as follows showing effect of treatment:

| Route of Infection | Route of Administration | $LD_{50}$ (mg./kg.) |
|---|---|---|
| i.p. | i.p. | 2.0 |
| i.p. | i.m. | 18.0 |
| i.p. | p.o. | 1460 × 2 |
| i.v. | i.p. | 16.0 × 2 |
| i.v. | i.m. | 24.0 × 2 |

The following examples are only for illustration of the process and products of the present invention and are not to be construed as limiting.

EXAMPLE 1

One liter of aqueous medium consisting of glucose 2%, polypeptone 1%, corn steep liquor 1%, $KH_2PO_4$ 0.2% and $MgSO_4$ 0.1% was equally divided and introduced into ten 500 ml. Erlenmeyer flasks (pH 6.5), sterilized at 120°C. for 15 minutes. *Aspergillus aculeatus* M 4214 FERM-P 2324 is inoculated therein and shake cultured at 26°C. for 48 hours. The cultured broth was inoculated into 180 l. of sterilized medium of the same content hereinabove in a 250 l. tank and submerged cultured at 26°C. for 15 hours with agitation 250 r.p.m., aeration 180 l./min. 60 l. of the cultured broth were aseptically inoculated into 2200 l. of aqueous medium (pH 6.5) consisting of saccharose 1.5%, dextrin 1.4%, polypeptone 2%, corn steep liquor 0.45%, $KH_2PO_4$ 0.2%, $MgSO_4$ 0.1% and anti-foamer 0.1% in a 2500 l. capacity main fermentation tank, and fermented at 26°C. for 90 hours with aeration of 1100 l./min. and agitation of 200 r.p.m. to obtain 2000 l. of fermented broth. The broth assayed 22 gamma/ml. in filtrate and 180 gamma/ml. of aculeacins in mycelia.

EXAMPLE 2

Cultured broth (2000 l.) obtained in Example 1 is treated by centrifuge to obtain wet mycelia (130 kg.). To the wet mycelia was added 400 l. of methanol, extracted under stirring for 18 hours, and 435 l. of methanol solution was obtained by centrifuge. Residual mycelia were again extracted with methanol (200 l.) to obtain 185 l. of methanol extract. Both extracts were combined (containing 265 g. of aculeacins), and the methanol was distilled off under reduced pressure to obtain 50 l. of concentrate. Thereto was added 50 l. of water and the medium was extracted twice with 50 l. of n-butanol each time. The n-butanol layer was collected (containing aculeacin 201 g.). After the n-butanol layer was washed with water, the butanol was concentrated while adding a small amount of water, to 22 l. 550 g. of active carbon was added therein and the medium was filtered, then concentrated in vacuo to obtain 5 l. of dark browncolored viscous concentrate. The concentrate was charged on a column of active alumina (10 l.). The column was washed with 20 l. of ethyl acetate, thereafter eluted with ethanol and each 5 l. fraction was collected. Fractions Nos. 3–13 assayed as active and were combined and treated with active carbon (100 g.). After removal of carbon, the filtrate was concentrated to 500 ml. of oily substance. This oily substance was charged on a column of silica gel (15 l.) packed with ethyl acetate-methanol (10 : 1), and developed with the same solvent (40 l.) to remove fatty impurities. Thereafter each 2 l. fraction was eluted with ethyl acetate-methanol (5 : 1) and fractions Nos. 3 to 15 were collected. The collected fractions were combined and concentrated in vacuo to obtain a yellowish powder (51 g.). The powder was dissolved in methanol (200 ml.), and thereto was added 1 l. of ethyl acetate-n-hexane (1 : 1), gradually, to precipitate the aculeacins, which were collected by filtration and dried in vacuo to obtain 41 g. of white powder (purity 68%).

EXAMPLE 3

1.7 g. of crude aculeacins obtained in Example 2 dissolved in 5 ml. of n-butanol was charged on a silica gel column packed with a water-saturated solvent of ethyl acetate-n-butanol (4 : 1). The column was eluted with the same solvent and 10 g. fractions were collected. Each fraction was assayed by bio-assay and thin layer chromatograph to find the activity of Nos. 33 to 55 fractions. Vacuum drying gave 629 mg. of white powder. The powder was further purified by dissolving in n-butanol (50 ml.), and was washed three times with distilled water (each 10 ml.) and dried in vacuo. 577 mg. of purified aculeacin-A was obtained.

EXAMPLE 4

The fermentation of Example 1 was repeated three times to obtain 5.6 kl. of cultured broth. This broth was centrifugally separated to obtain 450 kg. of wet mycelia. To the mycelia was added methanol (1.2 kl.), and the mixture was extracted with stirring for 20 hours, and centrifuged to obtain methanol extract (1.3 kl.). Mycelia were again extracted with methanol (1 kl.). 850 l. of this extract were combined with the first extract and concentrated in vacuo to 150 l. Thereto was added 150 l. of water and the mixture was then extracted with n-butanol (150 l.). Active carbon (2 kg.) was added to the separated n-butanol layer. The decolorized solution was concentrated azeotropically to obtain a dark brownish viscous concentrate (6 l.). 40 l. of n-hexane were added therein and the precipitate was separated by centrifugation and washed with n-hexane to obtain dark brownish aculeacins crude powder (847 g.). After washing with ethyl acetate (3 l.), this crude powder was dissolved in methanol (1 l.), and ethyl acetate (10 l.) was added with stirring and precipitated material was separated by centrifugation. After washing with ethyl acetate, the powder was dried in vacuo to obtain light brown crude aculeacins powder (369 g.).

EXAMPLE 5

Crude aculeacins powder obtained in Example 4 (123 g.) was dissolved in n-butanol (200 ml.) and charged on a column of silica gel packed with a mixed solvent of ethyl acetate-n-butanol-water (10 : 2 : 1), then developed with the same solvent mixture. Each 1 liter fraction was assayed by bio-assay and thin layer chromatograph. Fractions Nos. 4 to 25 containing aculeacin-B, -C and -D (fraction I) which was eluted prior to aculeacin-A and No. 44 to No. 60 containing aculeacin-E, -F and -G (fraction II) which was eluted after aculeacin-A were collected and concentrated in vacuo. Fraction I (23.4 g.) and fraction II (5.7 g.) were obtained as powder. The remaining crude powder in Example 4 was treated by the same procedure to obtain the powder of fraction I (70 g.) and fraction II (17 g.).

EXAMPLE 6

Fraction I powder (70 g.) obtained in Example 5 was dissolved in isopropanol (100 ml.) and charged on a column of silica gel packed with a mixed solution of ethyl acetate-isopropanol-water (10 : 1 : 0.5), then developed by the same solvent. Each 500 ml. fraction was checked by thin layer chromatography and fractions Nos. 22 to 39 were collected. The combined fractions were concentrated in vacuo to obtain purified fraction I (14.5 g.).

The powder was dissolved in methanol (15 ml.) and charged on a column of silica gel packed with chloroform-methanol (10 : 1), then developed by the same solvent. Each 20 g. fraction was collected.

Fractions Nos. 275 to 310 contained aculeacin-B and were collected and concentrated in vacuo to obtain a white powder (495 mg.). Purified powder (447 mg.) of aculeacin-B was obtained by dissolving in n-butanol (40 ml.), washing twice with water (10 ml.) and concentration.

Fractions Nos. 311 to 340 were collected and concentrated to obtain a mixture of aculeacin-B and -C (1050 mg.).

Fractions Nos. 341 to 365 were concentrated to obtain aculeacin-C powder (995 mg.). The powder was dissolved in isopropanol (4 ml.) and charged on a column of silica gel packed with ethyl acetate-isopropanol-water (10 : 1 : 0.5) and thereafter developed with the same solvent. Fractions Nos. 46 to 80, each of 20 g., contained aculeacin-C. The fractions were collected and concentrated in vacuo to obtain a white powder (610 mg.). Purified aculeacin-C powder (522 mg.) was obtained by dissolving in n-butanol (40 ml.) and washing twice with water.

Fractions Nos. 531 to 625 were collected and concentrated in vacuo to obtain aculeacin-D powder (1200 mg.). The powder was dissolved in isopropanol (5 ml.) and charged on a column of silica gel packed with ethyl acetate-isopropanol-water (10 : 1 : 0.5). Development was carried out by the same solvent to obtain 20 g. fractions. Fractions Nos. 70 to 120, which contained aculeacin-D, were collected and concentrated in vacuo to obtain a white powder (355 mg.). The powder was purified by dissolving in n-butanol (40 ml.) and washing with water. Purified aculeacin-D powder (313 mg.) was obtained.

EXAMPLE 7

Powder (17 g.) of fraction II obtained in Example 5 was dissolved in n-butanol (40 ml.) and charged on a column of ethyl acetate-n-butanol-water (10 : 2 : 1). Development was carried out by the same solvent. Each 500 ml. fraction was collected and assayed.

Fractions Nos. 17 to 23 contained aculeacin-E and F, and Nos. 24 to 31 contained aculeacin-G.

Each fraction was collected and treated to obtain a mixed powder of aculeacin-E and -F (330 mg.) and aculeacin-G crude powder (800 mg.).

The above mixture of aculeacin-E and -F was dissolved in methanol (6 ml.), charged on a column of silica gel packed with chloroform-methanol (10 : 2) and developed with the same solvent to obtain 20 g. fractions. Fractions Nos. 135 to 175 contained aculeacin-E obtained as a white powder (175 mg.). This powder was dissolved in 20 ml. of n-butanol, washed twice with water (5 ml.) and concentrated in vacuo to yield purified aculeacin-E powder (155 mg.).

Fractions Nos. 241 to 320 contained aculeacin-F. White powder (903 mg.) was obtained by concentration. Purified aculeacin-F was obtained as a white powder (872 mg.). Aculeacin-G crude powder was purified by dissolving in methanol (3 ml.) and chromatographed by chloroform-methanol (10 : 2) mixture on a silica gel column. Fractions each of 20 g., Nos. 181 to 240, contained aculeacin-G. Concentration produced a white powder (408 mg.). This powder was purified by the same procedure as hereinabove to obtain purified aculeacin-G powder (334 mg.).

What we claim is:

1. An antifungal antibiotic aculeacin selected from the group consisting of aculeacin-A, aculeacin-B, aculeacin-C, aculeacin-D, aculeacin-E, aculeacin-F and aculeacin-G, said aculeacins having substantially the following physico-chemical properties:

Elementary analysis:

|  | C% | H% | N% |
| --- | --- | --- | --- |
| Aculeacin-A | 56.38 | 8.01 | 9.29 |
| Aculeacin-B | 60.52 | 8.54 | 9.46 |
| Aculeacin-C | 59.04 | 8.27 | 9.66 |
| Aculeacin-D | 57.95 | 8.02 | 8.83 |
| Aculeacin-E | 57.46 | 8.01 | 9.11 |
| Aculeacin-F | 54.81 | 7.59 | 9.04 |
| Aculeacin-G | 56.08 | 7.73 | 8.68 |

Molecular weight:

|  | Rast Method: | Amino acid analysis:* |
|---|---|---|
| Aculeacin-A | 1021 | (869) n |
| Aculeacin-B | 1145 – 1206 | (540) n |
| Aculeacin-C | 1133 – 1199 | (540) n |
| Aculeacin-D | 1209 – 1284 | (555) n |
| Aculeacin-E | 1195 – 1270 | (650) n |
| Aculeacin-F | 1227 – 1287 | (565) n |
| Aculeacin-G | 1255 – 1330 | (710) n |

*Calculated from detected amount of threonine

Molecular formula:

| Aculeacin-B: | $C_{58-61}H_{96-104}N_8O_{15-16}$ |
|---|---|
| Aculeacin-C: | $C_{56-59}H_{92-100}N_8O_{16-17}$ |
| Aculeacin-D: | $C_{58-62}H_{96-104}N_8O_{19-20}$ |
| Aculeacin-E: | $C_{57-61}H_{94-104}N_8O_{19-20}$ |
| Aculeacin-F: | $C_{56-59}H_{90-98}N_8O_{22-23}$ |
| Aculeacin-G: | $C_{58-62}H_{94-106}N_8O_{22-23}$ |

Melting point:

| Aculeacin-A: | 164 – 167°C. (fuse) |
|---|---|
| Aculeacin-B: | 148 – 151°C. (fuse) |
| Aculeacin-C: | 164 – 168°C. (fuse) |
| Aculeacin-D: | 159 – 162°C. (fuse) |
| Aculeacin-E: | 186 – 191°C. (fuse) |
| Aculeacin-F: | 163 – 167°C. (fuse) |
| Aculeacin-G: | 166 – 170°C. (fuse) |

Specific Rotation: $[\alpha]_D^{24}$ (C=1.0 methanol)

| Aculeacin-A*: | –53° |
|---|---|
| Aculeacin-B: | –45° |
| Aculeacin-C: | –47.5° |
| Aculeacin-D: | –46° |
| Aculeacin-E: | 66° |
| Aculeacin-F: | –55° |
| Aculeacin-G: | –52° |

*Result of $[\alpha]_D^{23}$ (C=0.53 methanol)

Infrared absorption spectrum (KBr tablet):

| Aculeacin-A: | as shown in FIG. 5 in the accompanying drawings |
|---|---|
| Aculeacin-B: | as shown in FIG. 18 in the accompanying drawings |
| Aculeacin-C: | as shown in FIG. 19 in the accompanying drawings |
| Aculeacin-D: | as shown in FIG. 20 in the accompanying drawings |
| Aculeacin-E: | as shown in FIG. 21 in the accompanying drawings |
| Aculeacin-F: | as shown in FIG. 22 in the accompanying drawings |
| Aculeacin-G: | as shown in FIG. 23 in the accompanying drawings. |

2. A compound as claimed in claim 1, in which said aculeacin is said aculeacin-A.

3. A compound as claimed in claim 1, in which said aculeacin is said aculeacin-B.

4. A compound as claimed in claim 1, in which said aculeacin is said aculeacin-C.

5. A compound as claimed in claim 1, in which said aculeacin is said aculeacin-D.

6. A compound as claimed in claim 1, in which said aculeacin is said aculeacin-E.

7. A compound as claimed in claim 1, in which said aculeacin is said aculeacin-F.

8. A compound as claimed in claim 1, in which said aculeacin is said aculeacin-G.

* * * * *